United States Patent [19]

Craig

[11] 3,715,470

[45] Feb. 6, 1973

[54] COLOR TELEVISION CAMERA ENCODER MATRIX WITH SUMMATION OF TWO COLOR VIDEO CURRENT SIGNALS AND A CONSTANT CURRENT SIGNAL

[75] Inventor: Philip V. C. Craig, Salt Lake City, Utah

[73] Assignee: Telemation Inc., Salt Lake City, Utah

[22] Filed: March 29, 1971

[21] Appl. No.: 129,076

[52] U.S. Cl...........178/5.4 R, 178/5.4 MA, 328/156, 330/30 R, 330/147

[51] Int. Cl...........H04n 9/52

[58] Field of Search........178/5.4 MA, 5.4 R, 5.4 SD, 178/5.2 A; 330/30 R, 124 R, 147, 148; 328/156

[56] References Cited

OTHER PUBLICATIONS

Television Engineering, Taylor and Kent, "A Stable Encoder for the Generation of NTSC Type Color Television Signals," pp. 500–505.

Television Engineering Handbook, First Edition, 1957, pages 17–74–17–77.

*Primary Examiner*—Robert L. Griffin
*Assistant Examiner*—Donald E. Stout
*Attorney*—Lynn G. Foster

[57] ABSTRACT

A method and apparatus for encoding color information from the video signals of a color television camera comprising a matrix including a current summing transistor which is supplied by a constant current source and two color signals which are applied in parallel with each other and with the constant current source. The third color signal is applied to vary the bias of the summing transistor in a manner to cause variations in the currents summed from the first two color signals. Identical circuits may be employed with only minor changes for encoding to derive both the I and Q video signals.

6 Claims, 2 Drawing Figures

INVENTOR.
PHILIP V. C. CRAIG
BY
ATTORNEY

COLOR TELEVISION CAMERA ENCODER MATRIX WITH SUMMATION OF TWO COLOR VIDEO CURRENT SIGNALS AND A CONSTANT CURRENT SIGNAL

BACKGROUND

1. Field of Invention

This invention relates to color television cameras and is particularly directed to apparatus for encoding color information from the video signals to be televised.

2. Prior Art

In a color television encoder one of the design objectives is to produce two video signals called "I" and "Q". The voltages of these signals are FCC-defined functions of the red, green and blue video voltages. The circuits which generate "I" and "Q" videos are called matrices because they mix proportions of the red, green and blue video signals.

The NTSC standard specifies that color picture signal (disregarding sync., blanking and color burst) shall conform to $$E_M = E_y + (E_Q \operatorname{Sin}(\omega T + 33°) + E_I \operatorname{Cos}(\omega T + 33°))$$

Where $E_M$ is the composite modulated output amplitude and $E_Y$ is luminance amplitude, $E_Q$ and $E_I$ are "-color difference" signals which encode the necessary proportional mixtures of the three primary colors to be decoded at the receiver as a specific color hue.

The prior art method of encoding the proportional mix of three colors into each of the *I* and *Q* parameters is based upon the polarity indicated by the algebraic sign in the defining equations:

$$E_I = +0.5990 E_R - 0.2773 E_G - 0.3217 E_B$$

and $$E_Q = +0.2130 E_R - 0.5251 E_G + 0.3121 E_B$$

where $E_R$ is the amplitude of the signal from the red pickup tube, $E_G$ is from the green and $E_B$ from the blue pickup tube. The polarity of the green and the blue signal is negative in the formation of the I signal and the polarity of the green signal is negative in the formation of the Q signal. Thus, in the formation of the Q signal the red and blue signals can be added by a simple resistor network but the signal from the green pickup tube is inverted in an inverting amplifier before being added.

The I signal green and blue video voltages are negative which would require two inverting amplifiers except that the I color difference signal is sometimes generated as a −I signal and only one (the red signal) is inverted.

The accurate reproduction of any given hue, however, requires precise control of the percentage of mixtures, thus the specific yellow which is complementary to the primary blue requires precisely an "I" vector comprised of 5,990 units of red minus 2,773 units of green and a Q vector comprised of 2,130 units of red minus 5,251 units of green.

The importance of achieving high accuracy in these proportions can be appreciated by considering the reproduction of a pure gray. Utilizing the same level of Units as above, the "I" vector must have precisely 5,990 units of red minus 2,773 units of green and minus 3,217 units of blue. Note that +5,990 − 2,773 − 3,217 add algebraically to zero. Similarly the "Q" vector must have 2,130 units of red minus 5,251 of green plus 3121 of blue, and 2,130 − 5,251 + 3121 also adds up to zero. The significance of this is that in a properly functioning system reproducing a gray, a the chrominance signal has zero amplitude and the shade of gray depends only upon the amplitude of the luminance parameter, $E_U$. If, however, the negative values lack accuracy, the desired zero sum will not be achieved and a false chrominance signal will be developed.

The problem, then, is how to derive voltage proportions with desired accuracy of one part in a thousand. This order of accuracy can be achieved inexpensively and with a high degree of reliability with simple voltage dividing networks of precision resistors in the case of the positive voltages. But where inverting amplifiers are required by the present state of the art, however, such accuracy is lacking.

Many factors contribute to the inability of inverting amplifiers to give that order of accuracy (e.g., Instability because of temperature sensitivity, variation in individual components such as tubes or transistors). It is the present practice to compensate for the lack of accuracy by providing potentiometer for adjusting the output amplitude. It should be obvious that a provision for adjustment will not change an inverting amplifier into a precision device and that an opportunity for adjustment is also an opportunity for maladjustment.

In conventional resistor matrices the values of the matrix resistors are inverse to the desired proportions of red video, green video and blue video to be summed. For instance, the "I" matrix should sum $+0.5990E_r - 0.2773E_g - 0.3217E_b$ and the "Q" matrix should sum $+0.2180E - 0.5251E_g + 0.3121E_b$, and the matrix resistor values should be inversely proportional to the above given coefficients.

These coefficients are the expansion of the following FCC-defined formulas:

$$E_I = 0.74(E_r - E_y) - 0.27(E_b - E_y)$$

$$E_Q = 0.48(E_r - E_y) + 0.41(E_b - E_y)$$

$$E_y = 0.30E_r + 0.59E_g + 0.11E_b$$

An examination of the expansion of the $E_I$ formula shows that the red coefficient, $K_r = 0.74\,(1 - 0.30) - 0.27(-0.30)$;

green coefficient, $K_g = 0.74(-0.59) - 0.27(-0.59)$;

blue coefficient, $K_b = 0.74(-0.11) - 0.27(1 - 0.11)$.

The sum of the three coefficients is $$0.74.\,[(1 - 0.30) + (-0.59) + (-0.11)] - 0.27[(-0.30) + (-0.59) + (1 - 0.11)]$$

Since $(-0.30) + (-0.59) + (-0.11) = -1$, the sum of the three coefficients is $0.74[1-1] - 0.27\,[1-1]$ which is zero. A similar argument applies to the $E_Q$ coefficients.

Note that the coefficient given in the expanded $E_I$ formula, +0.5990, −0.2773, −0.3217 do total zero; similarly the $E_Q$ coefficients, +0.2130, −0.5251, +0.3121 also total zero. Since the matrix resistors are inverse to the coefficients, the coefficients are inverse to the resistor values. Thus the *I* formula can be rewritten:

$E_I = 1/R_r\ E_r\ 1/R_g\ E_g - 1/R_b E_b$, where $R_r$, $R_g$ and $R_b$ are the three matrix resistor values. Now since these three coefficients total zero, $1/R_r - 1/R_g - 1/R_b = 0$. Transposing, $1/R_r = 1/R_g + 1/R_b$, which is to say that in the $I$ matrix $R_r$ is the parallel sum of $R_g$ and $R_b$. A similar argument applies to the Q matrix resistors, the outcome being that in the $Q$ matrix $R_g$ is the parallel sum of $R_r$ and $R_b$. An arithmetic examination of any conventional set of $I$ or $Q$ matrix resistors demonstrates this point.

Brief Summary and Object of the Invention

Whereas conventional I and Q matrices use three precision resistors and two inverters to derive I and Q video, the present invention contained is a circuit which subtracts non-inverted videos directly and contains only two matrixing resistors, using the parallel sum of the two as the third resistor. This saves one precision resistor and avoids the adjustment component and thermal gain drift inherent in any conventional video bandpass unity-gain inverter.

Accordingly, it is an object of the present invention to provide improved means for encoding color information on video signals in a color television camera.

Another object of the present invention is to provide apparatus for encoding color information on video signals in a color television camera without requiring the use of inverting amplifiers.

A further object of the present invention is to provide structure for encoding color information on the video signals in a color television camera, which structure is inexpensive, accurate, reliable, and maintenance free.

An object of the present invention is to provide means for encoding color information from video signals in a color television camera by employing a current summing device controlled by input signals from said video signals and serving to convert the current sum into an output voltage together with a constant current source which is connected to the summing device in parallel with a pair of precision resistors which each provide an input for signals of respective colors.

These and other objects and features of the present invention will be apparent from the following detailed description taken with reference to the accompanying drawings.

DETAILED DESCRIPTION OF THE ILLUSTRATED EMBODIMENT

Figure 1:
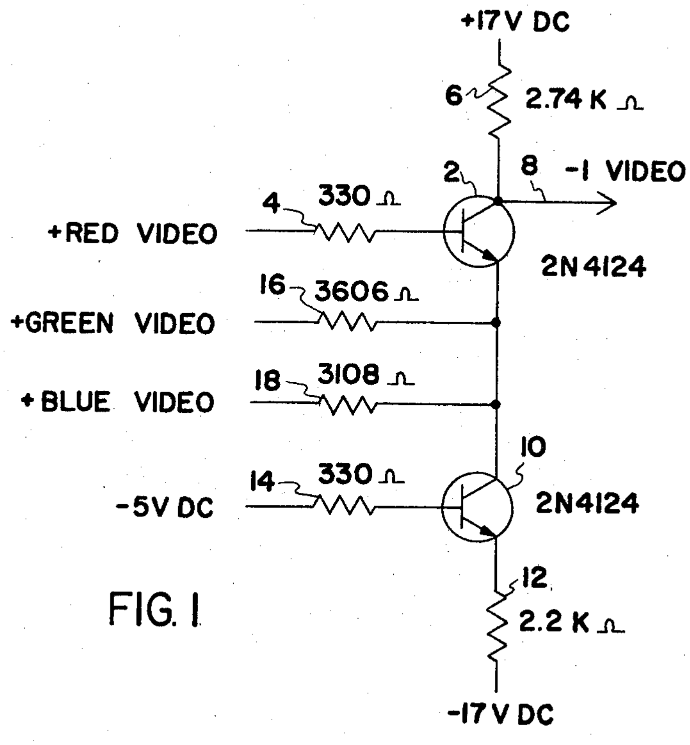
FIG. 1 is a diagrammatic representation showing apparatus embodying the present invention configured for encoding the I video signal of a color television camera.

In those forms of the present invention chosen for purposes of illustration, FIG. 1 shows the encoding apparatus of the present invention configured for encoding the I video signal. As shown, the apparatus comprises a current summing transistor 2 which is controlled by one color input applied through the base resistor 4. A 2.74K ohms load resistor 6 converts the summed current to a voltage which appears on output 8. Currents to be summed are supplied by a constant current source, formed by emitter-follower 10 with 2.2K ohm resistor 12 and 330 ohm resistor 12, and by the other two color inputs which are applied respectively through the parallel, precision resistors 16 and 18. Since resistor 12 and emitter-follower 10 form a constant current source of 2 megohms impedance, the current from this source will vary only 0.5 microamps for every volt of change in the collector of emitter-follower 10. Thus, current changes appearing across load resistor 6 are due only to voltage changes across the precision resistors 16 and 18. A comparison of FIG. 1 and 2 will reveal that the circuits are identical except for the values assigned to the precision resistors 16 and 18. However, it was shown above that, for the I matrix, seen in FIG. 1, $R_r$ is the parallel sum of $R_g$ and $R_b$.

In the I matrix of FIG. 1, a change in the red video is applied to base of transistor 2, which varies the emitter voltage of transistor 2, and, hence, is effectively applied to the parallel combination of the blue and green resistors 16 and 18 (which is the equivalent red matrix resistor), a change in green video is applied to the green resistor 16, and a change in blue video is applied to the blue resistor 18. If these changes occur simultaneously, the resultant change in circuit input voltages is the same as if the changes had occurred one at a time, so the net change in current through the load resistor 6 and consequent voltage at output 8 is proportional to the individual video changes divided by their respective matrix resistors. Since these matrix resistors are inverse to the $E_I$ formula coefficients, the output voltage is an analog derivation of $E_I$, which is the design objective. In any encoder the actual DC voltage level for $E_I = 0$ is set automatically by a video coupling capacitor which has its output clamped to the desired zero level during television horizontal sweep retrace time, when $E_r$, $E_g$, and $E_b$ videos are all at their defined zero levels. A similar argument applies to the "Q" matrix.

In the "I" matrix when the red video alone changes, the current through the emitter-follower 2 changes causing a small loss of red video amplitude across the junction of the emitter-follower 2 and the antiparasitic 330 ohm resistor 4. Typically this would be 2mv and 0.7mv, respectively, for a 1 volt change in red video. However, when the green and blue videos together change an amount equal to the above-mentioned change in red video, they cause an equal change in emitter-follower current at 2, losing an equal 2.7mv of change in matrix resistor voltage. Thus the matrixing accuracy is not impaired by this signal loss. The total gain of the matrix, which is determined by the ratio of the 2.74kohm load resistor 6 to the matrixing resistors, 16 and 18, is reduced a predictable 0.27 percent because of the junction of emitter-follower 2 and antiparasitic loss in resistor 4.

It is noteworthy that the 0.5 $\mu$a change in source current for each volt of red video change (in the I circuit) is cancelled by a corresponding decrease in collector-emitter voltage in the summing transistor 2, diverting this 0.5 $\mu$a into its base current. The result is typically a change of 0.1 $\mu$a load current per volt of input change when the three input videos change the same amount. Notice that since the three coefficients total zero, $E_I$ (or $E_Q$) should theoretically not change.

The fact that the "I" matrix produces −I video rather than +I video is of no undesirable consequence because when this video is applied to the color subcarrier modulator, the opposite phase of the subcarrier is then applied to the modulator to produce the desired modulator output.

The frequency response of these matrices is flat through the 10mhz desirable in a broadcast color camera. Also, neither the matrixing proportions nor the gain of the circuit is affected appreciably by temperature changes since they are dependent only upon the values of the two matrixing resistors and the load resistor.

Figure 2:
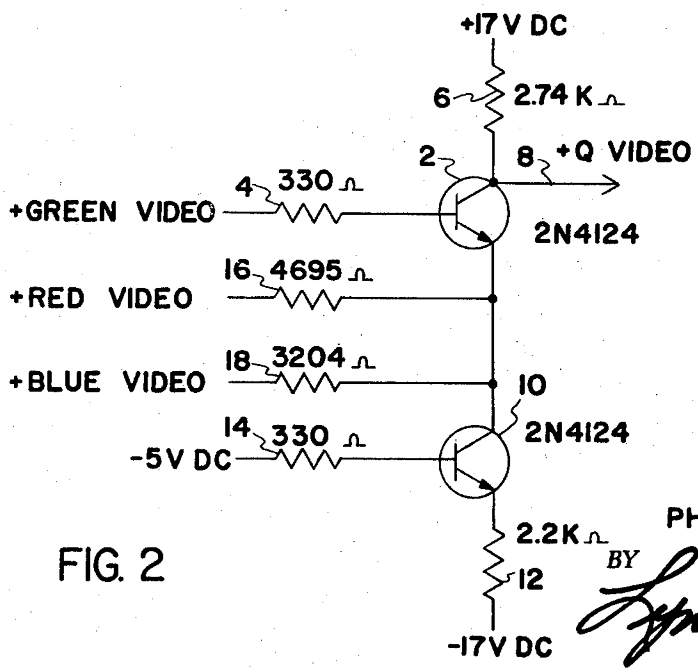
FIG. 2 is a diagrammatic representation showing the apparatus of FIG. 1 configured for encoding the Q video signal of a color television camera.

It was also shown that, for the Q matrix of FIG. 2, $R_g$ is the parallel sum of $R_r$ and $R_b$. To satisfy this with the apparatus of FIG. 2, $R_g$ must be the equivalent parallel sum of $R_r$ and $R_b$, while $R_r$ and $R_b$ must be the parallel resistors 16 and 18 and must have values of 4,695 ohms and 3,204 ohms, respectively. The operation of the Q matrix of FIG. 2 is identical to that of the I matrix of FIG. 1, discussed above.

It should be appreciated that the actual values of all resistors, including precision resistors 16 and 18, may be various other values as long as adequate impedance is provided and resistors 16 and 18 are kept in the exact ratios of the values indicated in FIGS. 1 and 2. The only effect of varying said resistors together is to vary the impedances and overall gains of the circuits.

It will be apparent that numerous variations and modifications may be made without departing from the present invention. Accordingly, it should be clearly understood that the form of the present invention described above and shown in the accompanying drawing is illustrative only and is not intended to limit the scope of the invention.

I claim:

1. A device for encoding color information from the video signals of a color television camera, said device comprising:

a current summing transistor;

a load resistor connected to said summing transistor to convert the current sum from said summing transistor into an output voltage;

a constant current source connected to said summing transistor to supply current through said summing transistor;

first and second precision resistors each connected to supply current to said summing transistor;

first color video signal input means connected to said first precision resistor to apply signals through said first precision resistor;

second color video signal input means connected to said second precision resistor to supply signals through said second precision resistor; and a third color video signal input means connected to the base of said summing transistor to apply signals to the base of said current summing transistor.

2. The device of claim 1 wherein:

said first color video signal input means provides a green video input;

said second color video signal input means provides a blue video input;

said third color video signal input means provides a red video input; and said output voltage produced by said load resistor is a −I video output.

3. The device of claim 1 wherein:

said first color video signal input means provides a red video input;

said second color video signal input means provides a blue video input;

said third color video signal input means provides a green video input; and said output voltage produced by said load resistor is a Q video output.

4. The device of claim 1 wherein:

said first precision resistor has a value of 3,606 ohms;

said second precision resistor has a value of 3,108 ohms.

5. The device of claim 1 wherein:

said first precision resistor has a value of 4,695 ohms;

said second precision resistor has a value of 3,204 ohms.

6. The method of encoding three video color signals in a color television camera, said method comprising the steps of:

summing first and second input color video current signals and a constant current to provide an output current;

applying a third input color video current signal to modify said summing operations in a manner to cause current variations in the values of currents produced by said first and second color video signals which summing current variations are proportional to the current variations of said third color video signal; and converting said output current to a voltage.

* * * * *